6212X
Sheet 1, 2 Sheets.
L. Disbrow.
App's. for Boring in Earth.
No.
Patented Nov. 1, 1830.
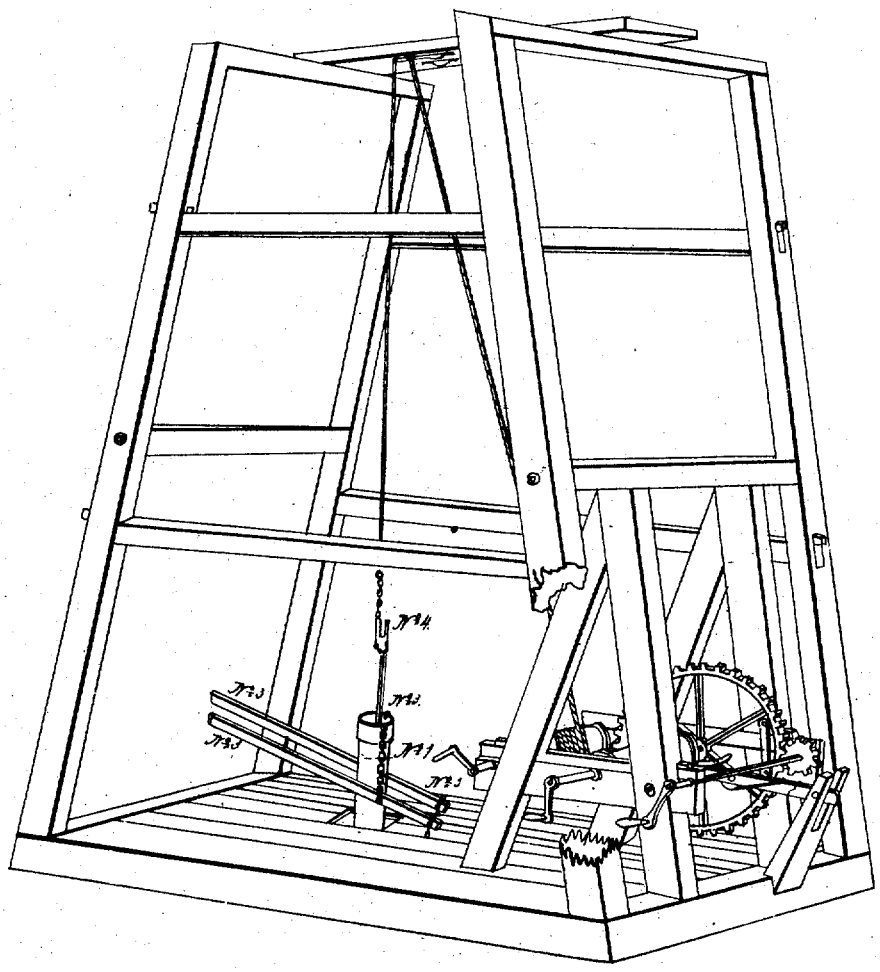

Sheet 2, 2 Sheets.
6212X L. Disbrow.
App's for Boring in Earth.
No. Patented Nov. 1, 1830.
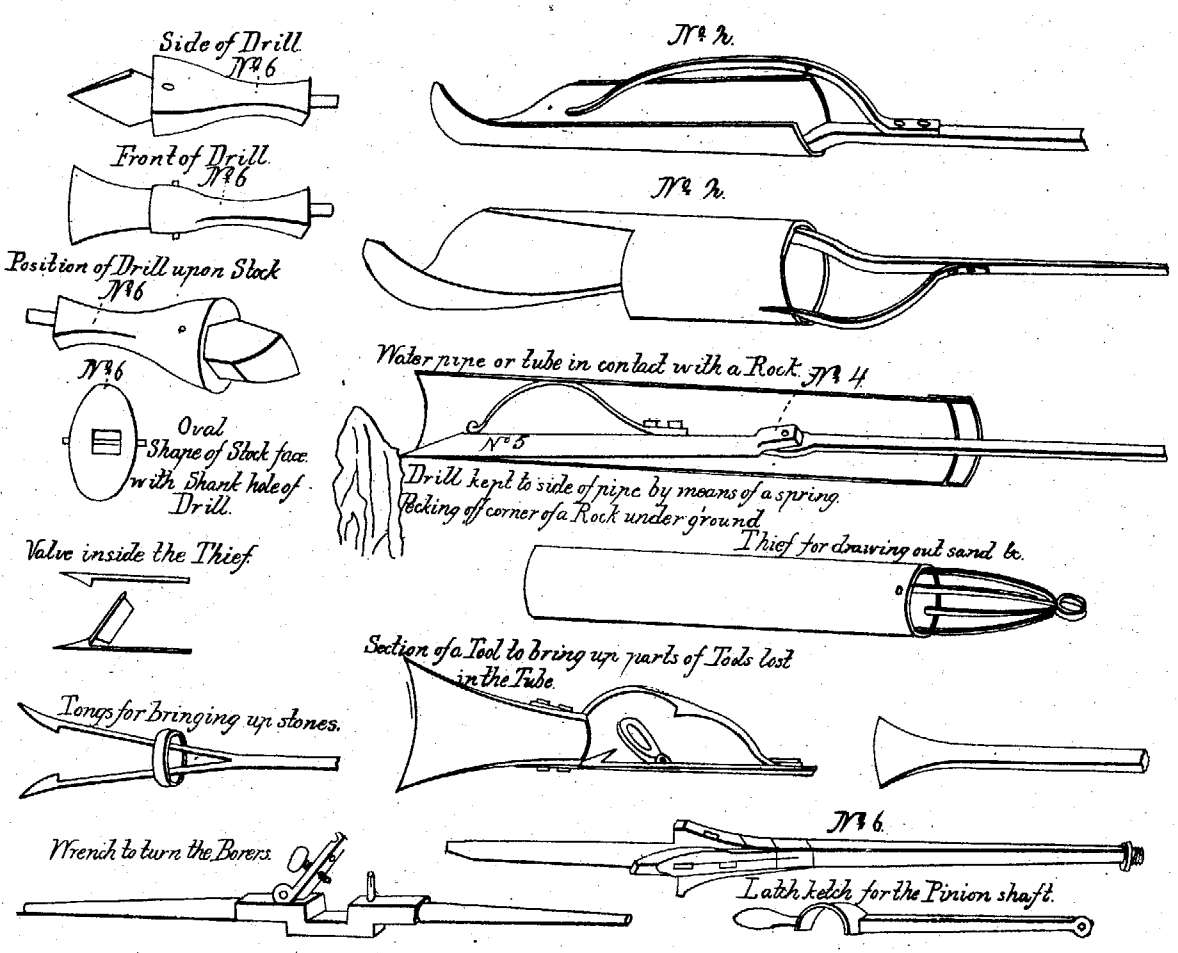

[illegible]

Nov 1 1830

287

Levi Disbrow City of New York.

6212X

Letters Patent Nov. 1. 1830. —

The Schedule referred to in these Letters Patent and making part of the same containing a description in the words of the said Levi Disbrow himself of his Improvement in the apparatus for boring Earth for water.

To all to whom these presents shall come I Levi Disbrow of the City of New York and a citizen of the United States send Greeting.

Be it known that I Levi Disbrow the inventor of a machine for boring the Earth for water have invented constructed made and applied to use a new and useful apparatus which is intended principally for boring into the earth. The Specification of the pipes and tools so used and applicable is as follows.

No. 1. The pipes for sinking in the earth are of cast iron, of an equal bore throughout, but of a diminished thickness taken from the outside near the end till it is small enough to fit into the socket formed on the next length of pipe; the socket is formed by a band of wrought iron, placed on the end of the pipe, but which when cold contracts and so remains permanent. The next length of pipe is formed in the same manner and so may be continued to any required length or depth. The joints are close as tied joints by driving wedges, and so resist either water or Steam.

No. 2. The pod or Cylinder bit for boring the earth passes through the pipe. It is made of iron pointed with Steel: there is a spring on the outside whose most disengaged State is larger than the outside of the pipe to the end that when it gets below the pipe it may cause a hole to be bored larger than the pipe to be received, and which is effected by the distention caused by the Spring.

No. 3. The chain and levers for forcing down the pipe. The levers are two pieces of [illegible] made fast to the platform by pieces of chains or other common means: the Chains have hooks at either end. One hook fastens on the Socket; the other is passed with the Chain round the lever and hooks in such part of the Chain as the purchase may

[illegible]

6212X require at pleasure No 4. <u>Rods Connected by Crutch joints and Screws</u> the rods are square lengths of iron there is a square crutch formed at each end of the length into which one admits the other the ends are held by screws which pass each other transversely by this means any length of rod may be securely connected, gaining the effect both of flexibility and strength.

No 5. <u>The Spring Chisel</u> is formed by a spring which confines the operation of the chisel or punch to the edge of the pipe as in the drawing its use is for breaking off pieces of stone which in part obstruct the passage of the pipe.

No 6. <u>The rock boring tools</u> are: First a sett of chisels or punches described in the drawing. Second a reaming bit: It is formed of four dies of Steel well bolted on a square rod which extends below as a guide. its use is to enlarge a hole already made to any proposed size:- the whole of the above tools and aparatus are used with the machine already patented to said Levi Disbrow dated twenty fourth of march one thousand eight Hundred and twenty five, as will appear on reference to the drawing annexed + In <u>testimony</u> that the above is a true Specification of my said Invention I have hereto set my hand and seal this thirtieth day of September in the Year of our Lord one thousand eight Hundred and thirty Levi Disbrow Exd. Witnesses
M.G. Alex. Watson
Wm Mulock (705 words)